Oct. 20, 1953

A. J. PETZINGER 2,656,510

ELECTRICAL MEASURING DEVICE

Filed Sept. 20, 1947

WITNESSES:
Robert C. Baird

INVENTOR
Ambrose J. Petzinger.
BY
ATTORNEY.

Patented Oct. 20, 1953

2,656,510

UNITED STATES PATENT OFFICE 2,656,510

ELECTRICAL MEASURING DEVICE

Ambrose J. Petzinger, Fair Lawn, N. J., assignor to Westinghouse Electric Corporation, East Pittsburgh, Pa., a corporation of Pennsylvania Application September 20, 1947, Serial No. 775,274

7 Claims. (Cl. 324—104)

This invention relates to devices responsive to a function of voltage and current of an alternating-current circuit, and it has particular relation to devices for measuring the vars and var-hours of alternating-current circuits.

In devices for measuring the product of two alternating current quantities multiplied by a function of the phase displacement therebetween, it is sometimes desirable to adjust the phase relationship of quantities supplied to the measuring device. For example, in order to measure the var-hours of an alternating-current circuit, it has been conventional practice to employ a watthour meter which has its voltage winding energized through a phase-shifting network. By shifting the phase of the voltage supplied to the voltage winding by 90° from the voltage of the alternating current circuit, the watthour measures var-hours.

The prior art also has employed a thermal demand meter for measuring var demand. To this end a conventional thermal demand wattmeter may be energized in accordance with the voltage of an alternating-current circuit through a phase-shifting network to convert the wattmeter into a varmeter.

It may be pointed out further that combined watt demand and watthour meters and combined var demand and var-hour meters have been employed in the prior art. An example of a combined watt demand and watthour meter will be found in the Vassar Patent 2,323,738.

The phase-shifting network employed for such purposes as converting watt demand or watthour meters to var demand or var-hour meters may employ resistors and capacitors in circuits well known in the art. Such networks require substantial space. When employed with a thermal demand meter, heat is generated not only by the heaters of the thermal demand meter but by the resistance of the phase-shifting network. It will be understood that the voltage energization of a thermal demand meter conventionally is supplied through a voltage transformer.

In accordance with the invention, the resistances of the heaters employed in the thermal demand meter are changed from values ordinarily employed for the thermal demand meter. By this procedure, it is possible to eliminate the resistance otherwise employed in the phase-shifting network. Although the efficiency of the thermal demand meter may be decreased, the overall efficiency of the thermal demand meter and the phase-shifting network may be increased by following the teachings of the invention.

It is, therefore, an object of the invention to provide a compact and efficient device which is responsive to a function of the voltage and current of an alternating-current circuit.

It is another object of the invention to provide a thermal meter device wherein a phase-shifting network is employed and a thermal demand meter unit is employed having heaters which provide values of resistance adjusted to eliminate the resistance conventionally employed in the phase-shifting network.

It is an additional object of the invention to provide a combined varmeter and var-hour meter which employs a thermal demand unit having heaters which provide values of resistance substantially lower than the values giving optimum efficiency for the thermal demand wattmeter unit and wherein the voltage energization for the thermal demand wattmeter is supplied through a capacitor and a transformer proportioned to energize the thermal demand wattmeter with a voltage displaced in phase by 90° from the voltage of a circuit with which the meter is associated.

Other objects of the invention will be apparent from the following description taken in conjunction with the accompanying drawing, in which.

Figure 1:
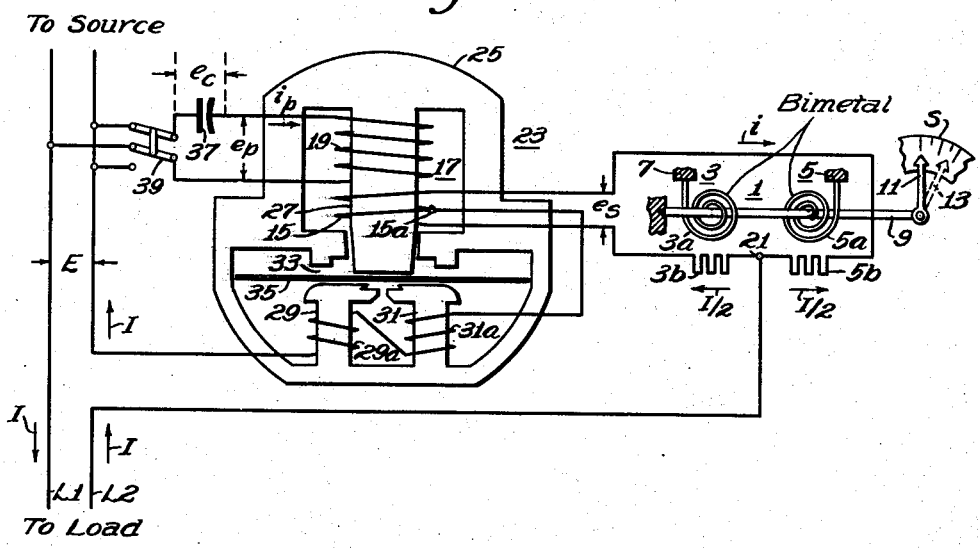
Figure 1 is a schematic view of a meter embodying the invention.

Referring to the drawing, Fig. 1 shows a circuit having conductors L1 and L2 for supplying electrical energy from a source to a load. The circuit may vary substantially in construction and may be designed to operate at any desired frequency. For the purpose of discussion, it will be assumed that the circuit is a single-phase alternating-current circuit operating at a frequency of 60 cycles per second.

The circuit of Fig. 1 has associated therewith a thermal demand meter 1 having two thermoresponsive units 3 and 5. These thermoresponsive units may differ in construction appreciably. In the specific embodiment herein discussed, it will be assumed that the thermoresponsive units comprise, respectively, spiral bimetallic springs 3a and 5a. These springs have their outer ends secured to a stationary support 7 and their inner ends differentially secured to a shaft 9. The shaft 9 carries a pointer 11 which may be constructed to push a demand pointer 13 up-scale in a manner well understood in the art. The pointers are disposed for movement over a scale S.

Each of the bimetallic springs may have one or more electrical heaters associated therewith. If desired, current may be directed through each of the springs to heat the springs directly. However, in Fig. 1, separate heaters $3b$ and $5b$ are associated, respectively, with the springs $3a$ and $5a$. The heaters $3b$ and $5b$ may have substantially equal resistances and are connected in series across the secondary winding 15 of a voltage transformer 17. The voltage transformer has a primary winding 19 inductively coupled to the secondary winding. Provision is made in any suitable manner for energizing the heaters $3b$ and $5b$ in parallel from a desired source. In the specific embodiment of Fig. 1, a center tap $15a$ is provided on the secondary winding 15. In addition, a terminal 21 is located between the heaters $3b$ and $5b$. By connecting a source of electrical energy between the tap $15a$ and the terminal 21, the heaters $3b$ and $5b$ may be energized in parallel from the desired source.

Although the thermal demand meter 1 alone may be energized through the transformer 17, it is convenient in many applications to combine the demand meter 1 with an integrating meter 23. The integrating meter may include a magnetic structure 25 having a voltage pole 27 and current poles 29 and 31 which are spaced to define an air gap 33. An electroconductive armature 35 is disposed for rotation in the air gap. A damping magnet (not shown) is associated with the armature 35 for damping rotation thereof in a manner well understood in the art. Suitable translating means such as a meter register (not shown) may be provided for actuation by the armature 35.

By inspection of Fig. 1, it will be observed that the voltage pole 27 serves as part of the magnetic core for the windings 15 and 19 of the transformer 17. As a matter of fact, the primary 19 serves as a voltage winding for the integrating meter and directs voltage magnetic flux through the air gap 33. In addition, current windings $29a$ and $31a$ are wound, respectively, about the poles 29 and 31 to direct, when energized, a current magnetic flux through the air gap 33. The current connections for the integrating meter and the demand meter may be traced from the lower portion of the conductor L2 through the terminal 21, the heaters $3b$ and $5b$ in parallel, the tap $15a$ and the current windings $31a$ and $29a$ to the upper portion of the conductor L2. The portions of Fig. 1 thus far specifically described are similar in many respects to the structure illustrated in the aforesaid Vassar patent, and reference to such patent may be made for a further discussion of the construction of the thermal demand meter 1 and the integrating meter 23.

It is desired that the thermal demand meter 1 and the integrating meter 23 be connected to the circuit for measuring, respectively, the var demand and the var-hours of the circuit represented by the conductors L1 and L2. To this end, the voltage winding 19 is connected across the conductors L1 and L2 through a phase-shifting network which is represented by a capacitor 37.

In prior art devices, it has been necessary to employ with the capacitor 37 one or more external resistors to establish the desired phase relationship for measurement of var demand and var-hours. In accordance with the invention, the values of resistance employed for the heaters $3b$ and $5b$ are selected to eliminate the necessity for additional external resistors.

The voltage $e_s$ across the secondary winding 15 directs a current $i$ in series through the heaters $3b$ and $5b$. This produces what may be termed voltage losses in the heaters which are proportional to the expression $$\frac{e_s^2}{R_s}$$

where $R_s$ represents the resultant series resistance of the heaters $3b$ and $5b$. In addition, the line current I flowing through the heaters $3b$ and $5b$ in parallel produces current losses which are proportional to the expression $I^2R_p$ where $R_p$ represents the parallel resistance of the heaters $3b$ and $5b$.

Optimum efficiency of the meter 1 is obtained at only one load, but this is commonly selected to be somewhere between ½ scale and full scale so that full scale losses will not be any longer than necessary. The values of resistance of the heaters $3b$ and $5b$ which produce optimum efficiency for the thermal demand meter 1 are such that the following expression is satisfied $$i=\frac{I}{2}$$

For decreasing values of heater resistances, the voltage losses increase and the current losses decrease. Conversely, as the heater resistances increase current losses increase, and voltage losses decrease.

The resistance values selected for the heaters $3b$ and $5b$ do not affect the accuracy of the reading of the thermal demand meter, if properly calibrated. The effect of variations in the resistances of the heaters from the values giving optimum efficiency is to increase the losses of the thermal demand meter at and above the selected load without substantially impairing accuracy thereof.

In accordance with prior art practice, the resistances of the heaters had values such that the current $i_p$ flowing through the primary winding 19 lagged the voltage $e_p$ across the primary winding by approximately 80°. To produce a varmeter the prior art required a phase-shifting network employing both a capacitor and a resistor, and capable of shifting the primary voltage $e_p$ relative to the line voltage E by approximately 90°.

In accordance with the invention, the resistances of the heaters $3b$ and $5b$ are selected to make the phase displacement between the primary current $i_p$ and the primary voltage $e_p$ substantially less than 80°. This means that the resistance values of the heaters is selected to be substantially lower than the values commonly employed to give optimum efficiency, as above noted. As the resistances of the heaters are decreased, the phase displacement between the primary current and the primary voltage decreases and the amount of resistance required in the phase-shifting network decreases. Preferably, the resistances of the heaters have values selected to make the phase displacement between the primary current $i_p$ and the primary voltage $e_p$ equal to 45°. No resistor then is required in the phase-shifting network, the capacitor 37 alone sufficing to produce the desired phase shift of 90° between the primary voltage $e_p$ and the line voltage E.

Figure 2:
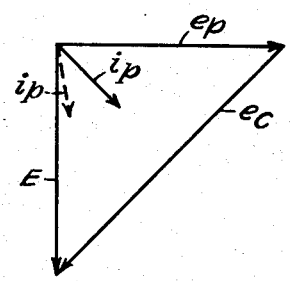
Fig. 2 is a vector diagram showing current and voltage relationships present in the meter of Fig. 1.

Phase relationships may be considered in greater detail with reference to Fig. 2. In prior art constructions the primary voltage $e_p$ would direct through the primary winding 19 a current $i_p$ (shown by a dotted vector in Fig. 2) which lags the primary voltage by approximately 80°.

As previously pointed out, the invention contemplates a reduction in the resistances of the heaters 3b and 5b below the values conventionally employed for the thermal demand meter 1. The resultant increase in the secondary current $i$ is reflected in an increase in the resistive component of the primary current $i_p$, and is proportioned to decrease the phase displacement between the primary voltage $e_p$ and the primary current $i_p$ to 45°. The resulting primary current $i_p$ is shown by a full-line vector in Fig. 2.

The voltage $e_c$ across the capacitor 37 lags the primary current $i_p$ by substantially 90°. The vector sum of the voltage $e_c$ across the capacitor and the primary voltage $e_p$ equals the line voltage. The capacitance of the capacitor 37 has a value selected to produce a voltage $e_c$ which brings the line voltage E and the primary voltage $e_p$ into quadrature. The line voltage E and the primary voltage $e_p$ then have equal values. Consequently, the thermal demand meter 1 and the integrating meter 23 are properly connected to measure var-demand and var-hours. To facilitate measurement of either leading or lagging vars and var-hours, the winding 19 may be energized from the line through a reversing switch 39. For one position of the switch leading vars and var-hours are measured. For the other position of the switch lagging vars and var-hours are measured.

A brief discussion will show the advantages derived from decreasing the resistances of the heaters 3b and 5b. In converting a thermal demand wattmeter into a varmeter, additional voltage losses must be provided to establish the desired quadrature relationship between line and primary voltages. These voltage losses may as well be provided in the thermal demand meter as in the phase-shifting network.

The additional voltage losses, whether in the network or in the meter tend to decrease the efficiency of the resulting varmeter. However, by locating the additional voltage losses in the meter one or more resistors are eliminated and the current losses of the meter are decreased. Consequently, the overall efficiency of the resulting varmeter is increased over corresponding prior-art varmeters by an amount represented, at least in part, by the decrease in current losses. Furthermore, the invention still permits the utilization of the primary winding of the transformer 17 as a voltage winding for the integrating meter 23.

If a phase shift between the voltages E and $e_p$ other than 90° is desired, the resistance values of the heaters may be selected to produce a phase displacement between the current $i_p$ and the voltage $e_p$ such that a capacitor voltage $e_c$ of proper magnitude alone adds to the voltage $e_p$ to equal the desired line voltage E. For example, if the voltages E and $e_p$ are to have equal magnitudes, the resistance values of the heaters may be selected to make the current $i_p$ bisect the angle between the voltages. The capacitance value of the capacitor then is selected to provide a voltage $e_c$ equal to the vector difference between the desired voltages E and $e_p$.

Should voltages E and $e_p$ be desired which differ in magnitude as well as phase, the same general principles may be followed. A vector diagram showing the desired voltages E and $e_p$ may be constructed and connected by a voltage $e_c$ representing the desired capacitor voltage in the manner shown in Fig. 2. The resistance values of the heaters then are selected to provide a current vector $i_p$ which leads the voltage $e_c$ by 90°.

Although the invention has been described with reference to certain specific embodiments thereof, numerous modifications are possible. The appended claims have been drafted to cover all modifications falling within the spirit and scope of the invention.

I claim as my invention:

1. In a thermal device responsive to reactive volt amperes of an alternating electrical circuit, a pair of thermoresponsive units each having an electrical heater, a transformer having a primary winding and a secondary winding, means connecting the electrical heaters in series across the secondary winding for energization in series through the transformer, means connecting the electrical heaters to conductors for energization in parallel through said conductors, translating means differentially responsive to the outputs of the thermoresponsive units, said heaters having electrical resistances smaller than the values giving optimum efficiency in the upper portion of the range of energization of the thermoresponsive units and said heaters having resistances proportioned to produce a displacement of substantially 45° in phase between the voltage across the primary winding and the current flowing through the primary winding.

2. In a varmeter device, a magnetic structure having voltage and current poles spaced to define an air gap, voltage and current windings associated with the poles and effective when energized for producing a shifting magnetic field in said air gap, an electroconductive armature having a portion in the air gap, means mounting the armature for rotation relative to the magnetic structure, a secondary winding inductively coupled to the voltage winding to form therewith a transformer wherein the voltage winding serves as a primary winding, a pair of thermoresponsive units each having an electrical heater, means connecting said heaters in series across said secondary winding, connections through which the heaters may be energized in parallel from a source of electrical energy, translating means differentially responsive to the outputs of the thermoresponsive units, and a capacitive reactance connected in series with the primary winding, said heaters having resistance values and the capacitor having a capacitance value proportioned to bring the primary voltage substantially into phase quadrature with an alternating voltage connected across the capacitive reactance and the primary winding in series.

3. A varmeter device as claimed in claim 2 wherein the resistances of the heaters are proportioned to establish a phase displacement of substantially 45° between the primary voltage and the primary current of the transformer, an alternating electrical circuit, means connecting the capacitor and the primary winding in series for energization in accordance with the voltage of the circuit and means associated with the connections for energizing the heaters in parallel in accordance with the current flowing in said circuit.

4. In a device responsive to the product of voltage and current of an alternating current circuit and a function of the phase displacement between the voltage and current, a transformer having a primary winding and a secondary winding, a watt-responsive translating device having substantial impedance connected to the secondary winding for voltage energization therefrom, a reactive impedance connected in series with the primary winding for energization from a suitable source of alternating energy, said translating device having a value of impedance selected to establish a quadrature relationship between the voltage across the primary winding and the voltage across the primary winding and reactive impedance in series.

5. A device as claimed in claim 4 wherein said impedances are proportioned to make said last-named two voltages equal in magnitude.

6. In a measuring device, a watthour meter having a voltage winding, a thermal watt-responsive meter having voltage and current input terminals, a secondary winding mutually coupled to the voltage winding, connections connecting the secondary winding to the voltage input terminals of the thermal watt-responsive meter for supplying voltage energization to the last-named meter, and a reactive impedance connected in series with the voltage winding, said thermal watt-responsive meter presenting a resistance across the voltage input terminals thereof which together with the reactive impedance are proportioned to bring an alternating voltage applied to the voltage winding and the reactive impedance in series into phase quadrature and equality in magnitude with the voltage across the voltage winding.

7. In an electrical device for measuring an alternating quantity, a first electrical instrument having a voltage winding and translating means responsive at least in part to the energization of the voltage winding, a second electrical instrument having a resistance input impedance, a secondary winding mutually coupled to the voltage winding to define a transformer for supplying electrical energy to the second electrical instrument, and a capacitive impedance connected in series with the voltage winding, the resistance of said input impedance being proportioned relative to the transformer and the capacitive impedance to provide a current for the voltage winding which has a vector bisecting the phase angle between vectors representing the voltage across the voltage winding and the voltage across the capacitive impedance and the voltage winding in series.

AMBROSE J. PETZINGER.

References Cited in the file of this patent

UNITED STATES PATENTS

| Number | Name | Date |
|---|---|---|
| 697,670 | Schrottke | Apr. 15, 1902 |
| 2,059,594 | Massa | Nov. 3, 1936 |
| 2,228,655 | Downing | Jan. 14, 1941 |
| 2,283,566 | Miller | May 19, 1942 |
| 2,300,958 | Oman | Nov. 3, 1942 |
| 2,323,732 | Smith | July 6, 1943 |

FOREIGN PATENTS

| Number | Country | Date |
|---|---|---|
| 511,367 | Great Britain | Aug. 17, 1939 |